United States Patent [19]

Boyer

[11] Patent Number: 5,609,006
[45] Date of Patent: Mar. 11, 1997

[54] WALL STUD

[76] Inventor: Robert W. Boyer, Rte. 2, Box 554, Newton, Iowa 50208

[21] Appl. No.: 544,336

[22] Filed: Oct. 17, 1995

[51] Int. Cl.[6] ................................................. E04C 1/40
[52] U.S. Cl. ...................... 52/731.9; 52/309.7; 52/376; 52/694; 52/729.2; 52/731.5
[58] Field of Search ........................ 52/731.5, 730.7, 52/731.7, 731.1, 376, 730.6, 731.8, 731.9, 737.3, 309.14, 653.1, 241, 729.2, 729.4, 731.4, 733.2, 737.6, 690, 693, 694, 695, 696, 309.7

[56] References Cited

U.S. PATENT DOCUMENTS

| 1,959,135 | 5/1934 | Miller | 52/729.4 |
|---|---|---|---|
| 2,252,956 | 8/1941 | Adler | 52/729.4 |
| 2,718,289 | 9/1955 | Collins | 52/731.5 X |
| 3,179,983 | 4/1965 | Webber et al. | 52/737.3 X |
| 3,282,005 | 11/1966 | Birdwell | 52/731.5 X |
| 3,531,901 | 10/1970 | Will, Jr. et al. | 52/737.3 X |
| 3,535,844 | 10/1970 | Glaros | 52/595 |
| 3,797,190 | 3/1974 | Widdowson | 52/595 |
| 4,038,802 | 8/1977 | Bajorek et al. | 52/731.4 |
| 4,223,500 | 9/1980 | Clark et al. | 52/309.4 |
| 4,409,768 | 10/1983 | Boden | 52/309.4 |
| 4,641,468 | 2/1987 | Slater | 52/309.4 |
| 4,653,242 | 3/1987 | Ezard | 52/737.3 |
| 4,674,250 | 6/1987 | Altizer | 52/309.7 |
| 4,795,666 | 1/1989 | Okada et al. | 428/71 |
| 4,852,322 | 8/1989 | McDermid | 52/729.4 |
| 4,854,096 | 8/1989 | Smolik | 52/731.5 X |
| 4,941,304 | 7/1990 | Lewellin | 52/580 |
| 4,949,518 | 8/1990 | Nagel et al. | 52/239 |
| 5,249,401 | 10/1993 | Schmid | 52/503 |
| 5,394,665 | 3/1995 | Johnson | 52/731.5 X |
| 5,452,556 | 9/1995 | Taylor | 52/730.7 |
| 5,464,302 | 11/1995 | Menchetti | 52/731.5 X |
| 5,519,978 | 5/1996 | Sucato et al. | 52/733.2 |

Primary Examiner—Michael Safavi
Attorney, Agent, or Firm—Zarley, McKee, Thomte, Voorhees, & Sease

[57] ABSTRACT

An improved wall stud utilized in framing structures, the wall stud including core elements and insulative materials enclosed within C-shaped frame members. The walls studs can be aligned and secured in a metal track mounted on the top and bottom ends of the wall studs. The wall studs provide good insulation, support, and easy access for the installation of electrical and plumbing equipment.

9 Claims, 5 Drawing Sheets

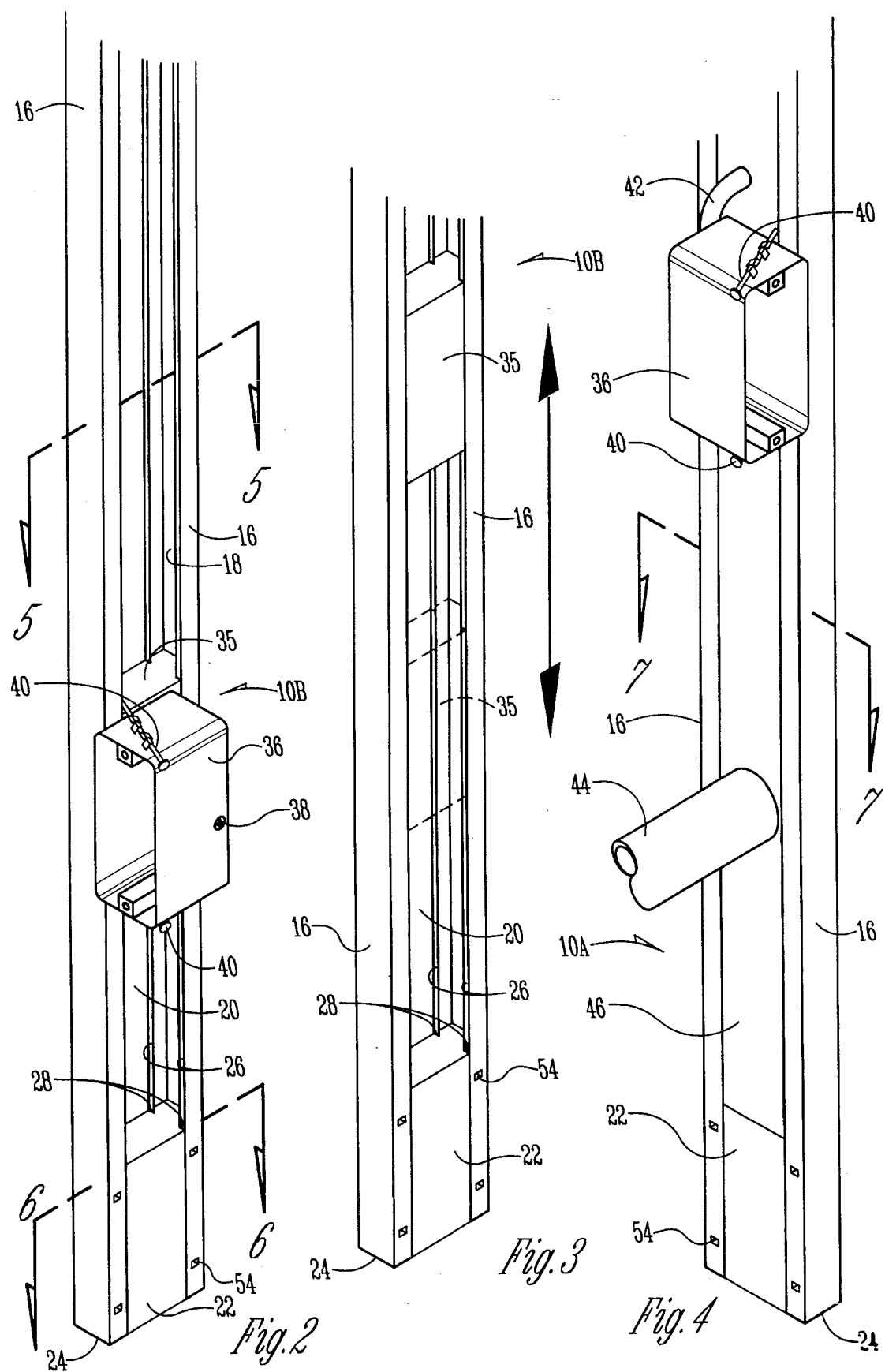

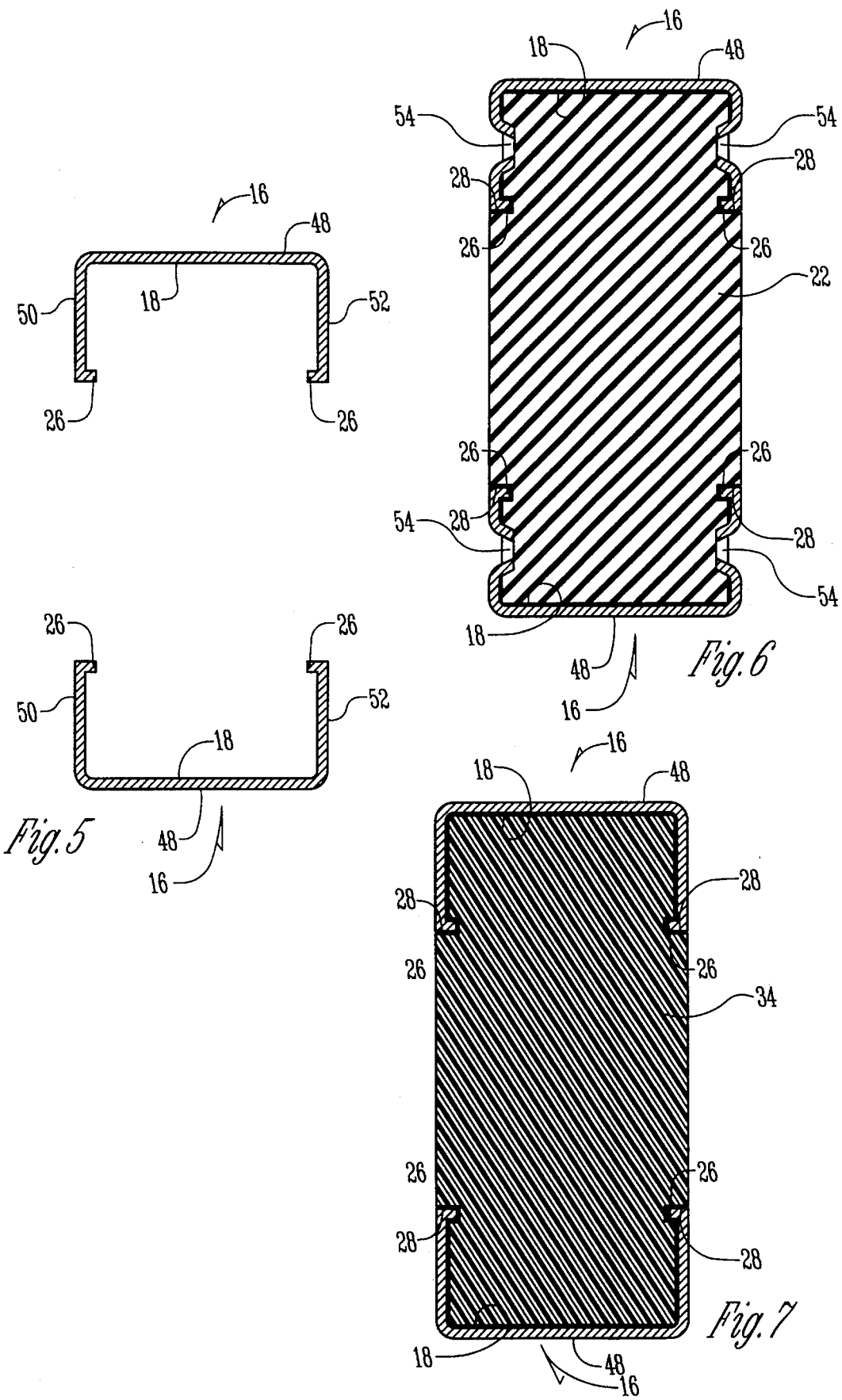

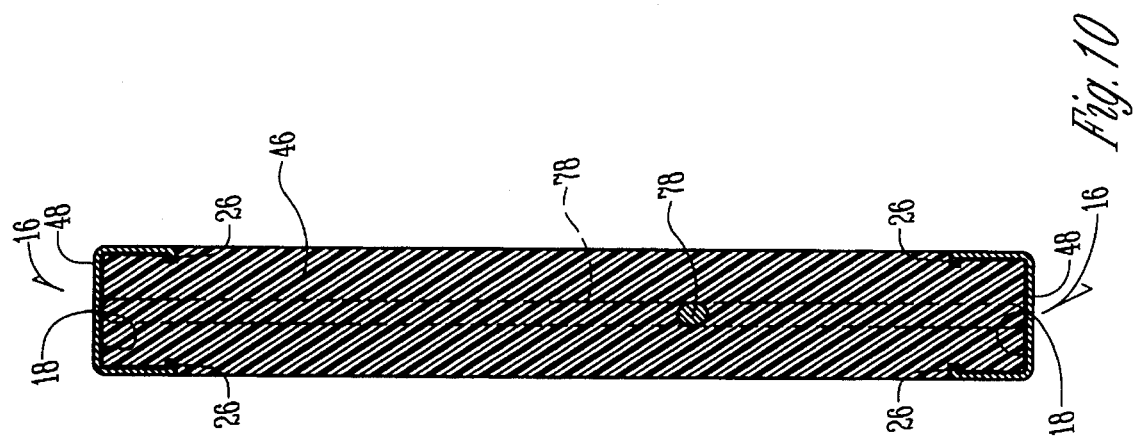
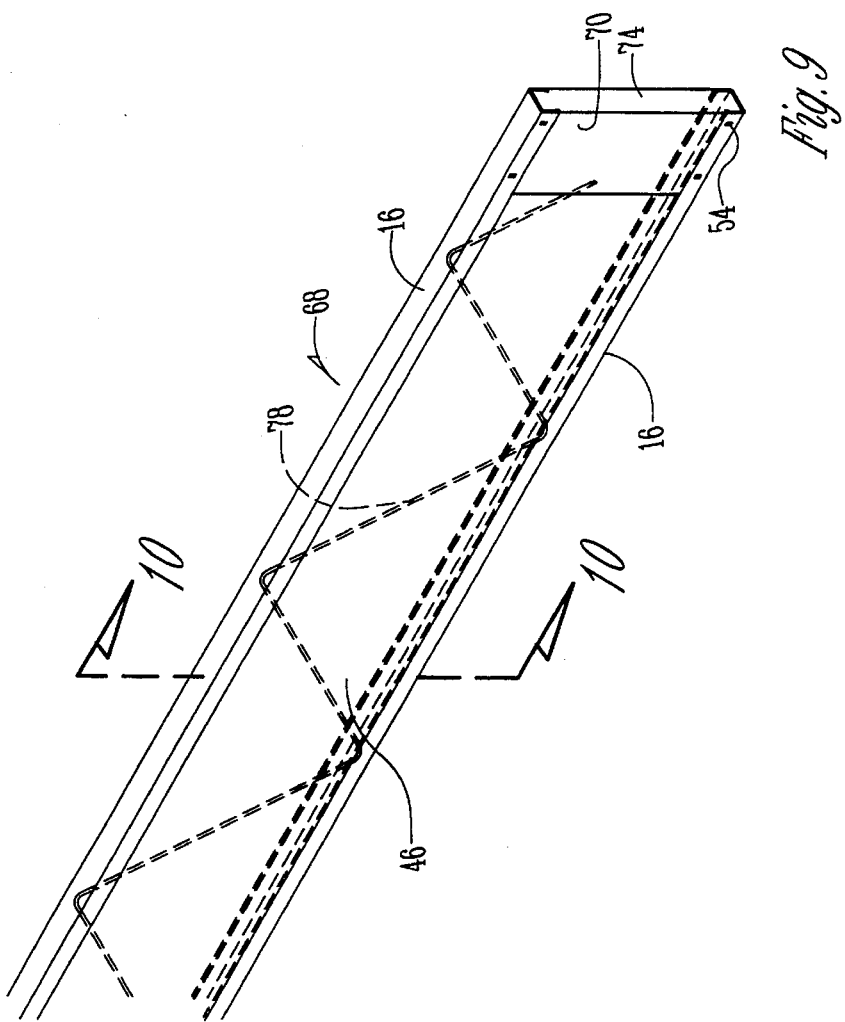

WALL STUD

BACKGROUND OF THE INVENTION

The present invention relates to wall studs generally replacing wooden studs utilized in framing structures such as houses.

Wooden studs are common in the construction industry. For many years, lumber was plentiful and inexpensive. Over the years, however, the supply of lumber has diminished. Consequently, lumber is more expensive and good quality lumber suitable for wall studs is more scarce.

Furthermore, wood is not always the desired material in all applications. For example, fire resistant housing is essential in many areas. Wood is also undesirable in areas infected with termites. In addition, it is difficult to run electrical wires and plumbing equipment through walls having solid wooden studs. Designing around these studs is time consuming and expensive.

Previous attempts to design a substitute for wooden studs have been unsuccessful. As with wooden studs, it is difficult to install electrical and plumbing equipment through solid metal studs. Modifying such wall studs is time consuming and can cause structural defects. Because metal is a good conductor of heat, prior art metal studs are also poor insulators. Finally, prior art metal studs are not easily adapted to accommodate electrical outlets and switches and carpenters cannot use nails and screws for adapting the studs in woodwork and molding applications.

Therefore, the primary objective of the present invention is the provision of an improved wall stud.

A further objective of the present invention is the provision of an improved wall stud that is a good insulator.

Another objective of the present invention is the provision of an improved wall stud that provides for the easy installation of electrical and plumbing equipment.

A further objective of the present invention is an improved wall stud that is suitable for use with carpenter's nails and screws.

A further objective of the present invention is the provision of an improved wall stud which is efficient in operation, economical in manufacture, and durable in use.

SUMMARY OF THE INVENTION

The foregoing objectives are achieved, in the preferred embodiment of the invention, by an elongated wall stud mounted in a vertical position. The wall stud is comprised of two elongated C-shaped frame members, a top core element positioned within the cavity formed by the frame members toward the top end of the stud, and a bottom core element similarly positioned within the cavity between the frame members toward the bottom end of the stud. The core elements are rigid and accept nails and screws.

If the wall studs are utilized in framing an outside wall, the preferred embodiment of the invention includes an insulative material positioned within the cavity between the frame members and between the top and bottom core elements. Metal by itself is a good conductor of heat and is therefore a poor insulator. Incorporating an insulative material such as polyurethane into the stud provides good insulation for outside walls. In addition, the insulative material reinforces the wall stud to ensure that the stud maintains its structural integrity when placed under large loads in outside wall applications.

For inside walls, the preferred embodiment of the invention includes additional core elements spaced apart between the top and the bottom end of the stud. These core elements are slidably mounted between the frame members and can easily be adjusted to a desired height to accommodate electrical outlets and switches. A substantial portion of the cavity remains hollow, allowing pipes and electrical wiring to be easily installed in the wall.

The core elements are particularly well suited for accepting carpenters nails and screws. As a result, carpenters can interchange wall studs of the present invention and wooden wall studs. A core element made from polyethylene is strong and does not split when deformed or compressed. To frame the stud, a U-shaped track is provided for aligning the studs and securing them to either the top or bottom structural surface.

BRIEF DESCRIPTION OF THE DRAWINGS

FIG. 2 is a perspective view of the wall stud of FIG. 1.

FIG. 3 is a perspective view of the wall stud of FIG. 1 showing a core element slidably mounted.

FIG. 4 is a perspective view of the wall stud showing insulative material stored within the cavity of the wall stud.

FIG. 5 is a sectional view taken along line 5—5 of FIG. 2.

FIG. 6 is a sectional view taken along line 6—6 of FIG. 2.

FIG. 7 is a sectional view taken along line 7—7 of FIG. 4.

FIG. 9 is a partial perspective view showing an alternative embodiment of the invention.

FIG. 10 is a sectional view taken along line 10—10 of FIG. 9.

DETAILED DESCRIPTION OF THE PREFERRED EMBODIMENT

Figure 1:
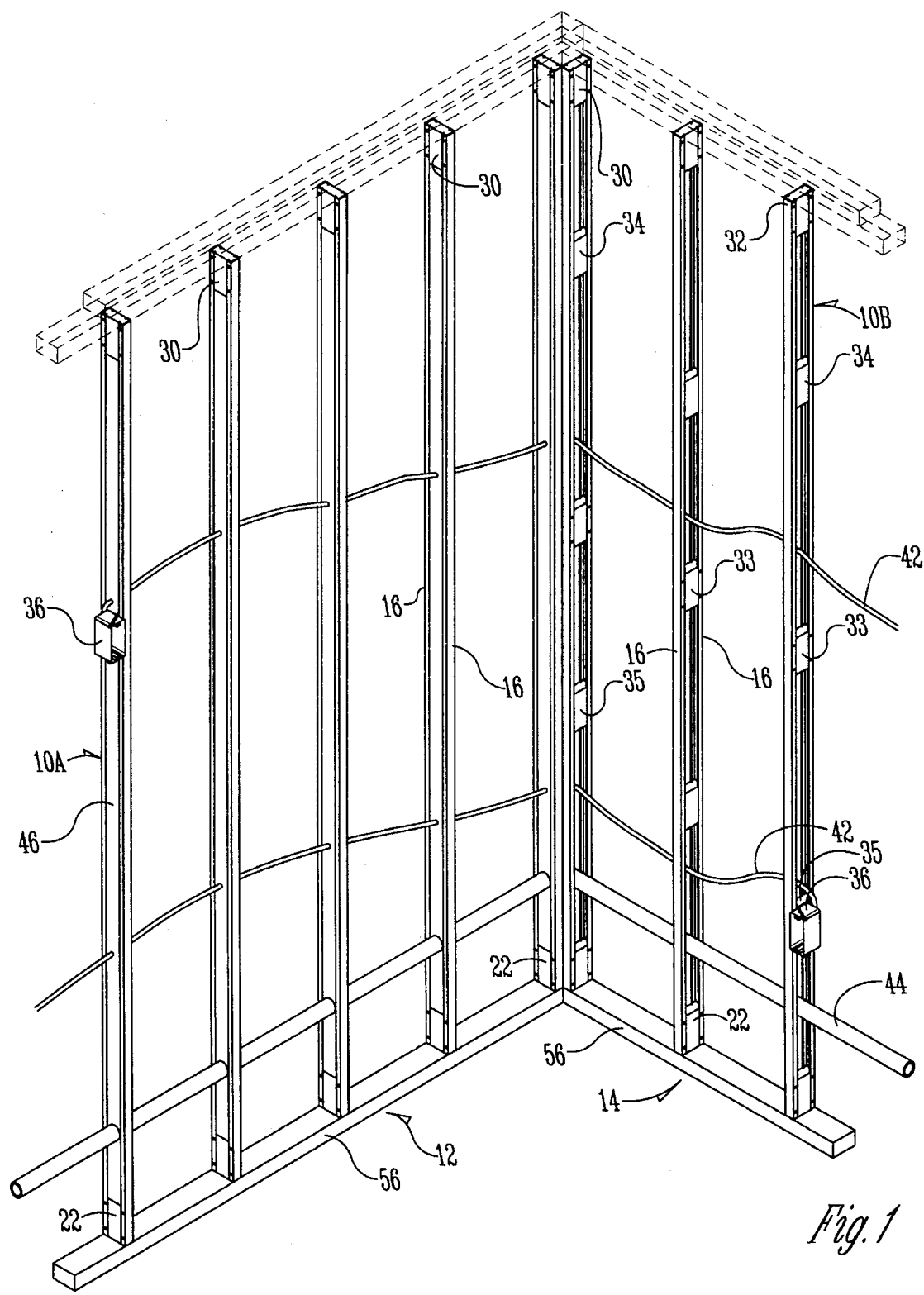
FIG. 1 is a perspective view of the preferred embodiment of the wall stud showing the wall stud used in framing outside and inside walls.

FIG. 1 shows a plurality of wall studs 10A and 10B used in framing an outside wall 12 and an inside wall 14, respectively. The wall stud 10B used in framing the inside wall 14, has two elongated C-shaped frame members 16. Each frame member 16 has an inside surface 18. The inside surfaces are spaced apart and facing to form an internal cavity 20.

A bottom core element 22 is positioned within the cavity 20 at the bottom end 24 of the wall studs 10A and 10B. The inner surfaces 18 of the frame members 16 partially enclose the bottom core element 22. To ensure that the frame members 16 do not separate from the bottom core element 22, keepers 26 on each frame member 16 extend inward and ride between slits 28 in the bottom core element 22. The top core element 30 is similarly constructed and positioned between frame members 16 at the top end 32 of the wall studs 10A and 10B.

A center core element 33 is positioned in the center of the stud 10B within the cavity 20. Additional core elements 34 and 35 are positioned within the cavity 20 between the top core element 30 and the center core element 33 and between the center core element 33 and the bottom core element 22, respectively. Center core element 33 and additional core elements 34 and 35 give the wall stud 10B additional support and also provide a structure for mounting electrical boxes 36.

The electrical box 36 is used to house such things as electrical switches and electrical outlets. The electrical box 36 attaches to the core elements 33, 34, and 35 in a variety of ways. Preferably, the electrical box 36 is glued to the core elements. Screws 38 and/or nails 40 can also be used. Although the center core element 33 is fixed in position along the wall stud 10B, additional core elements 34 and 35 are left slidably mounted. Thus, the electrical box 36 can be easily adjusted to different heights along the wall stud 10B by sliding the additional core elements 34 and 35 either up or down the wall stud (see FIG. 3).

Although the core elements 22, 30, 33, 34, and 35 can be made from a variety of materials such as wood, polyethylene is the preferred material. Polyethylene will not crack when screws and nails are inserted into the core element. Further, polyethylene is a fire resistant and strong material.

Because the wall studs 10A and 10B are designed to facilitate the use of carpenter's nails and screws, a carpenter can easily interchange studs 10A and 10B and wooden studs. This is particularly important in customized window and door applications where wooden studs are often preferred.

For outside wall applications, a substantial portion of the cavity 20 in the wall stud 10A is hollow. As a result, electrical wiring 42 and pipe 44 are easily inserted and installed inside the cavity 20.

The wall stud 10A used in outside wall applications is similar to the wall stud 10B used in inside wall applications. The top and bottom core elements 30 and 22 are positioned at the ends of the wall stud 10A. In framing an outside wall, it is desirable that the wall be a good insulator. Thus, wall studs 10A also contain an insulative material 46 positioned within the cavity 20 between the top core element 30 and the bottom core element 22. A variety of insulative materials can be used. The preferred material, however, is polyurethane. Polyethylene has an R-factor of approximately 7, more than three times that of wood. Furthermore, when wood absorbs moisture, its insulating factor is even lower.

In addition to providing good insulation, outside walls must also be able to support large loads. Polyurethane is a strong material and inserting polyurethane into the cavity 20 of the wall stud 10A reinforces the stud and ensures that the stud maintains its structural integrity.

Polyurethane and other insulative materials can easily be cut and shaped to provide access for electrical wires 42 and pipe 44. The electrical box 36 can be mounted to the insulating material 46 using glue, nails, screws, or any combination.

FIG. 5 is a sectional view of the frame members 16. Each frame member has a back wall 48, side walls 50 and 52, and keepers 26. The inside surfaces 18 of the frame members 16 partially enclose the core elements 22, 30, 33, 34, and 35 and the insulative material 46 (see FIGS. 6 and 7). The preferred material for the frame members 16 is galvanized steel.

It is relatively inexpensive to increase the size of the wall studs 10A and 10B from, for example, a 2×4 to a 2×8. The same frame members 16 and only slightly larger core elements and insulative material are used. In contrast, increasing the size of a wooden stud results in a significant additional cost.

Once center core element 33 is slid into position in the center of the wall stud 10B, the center core element 33 is secured by punching through side walls 50 and 52 of the frame members 16. The resulting punch 54 secures the center core element 33 along the wall stud 10B. Using a punch to secure the center core element 33 is only one means of securing the core element along the stud 10B. Top and bottom core elements 22 and 30 are similarly secured at the top end 32 and bottom end 24 of the wall stud 10A and 10B, respectively. Additional core elements 34 and 35 are left slidably mounted along the wall stud 10B so they can be easily adjusted in height to accommodate electrical boxes 36.

Figure 8:
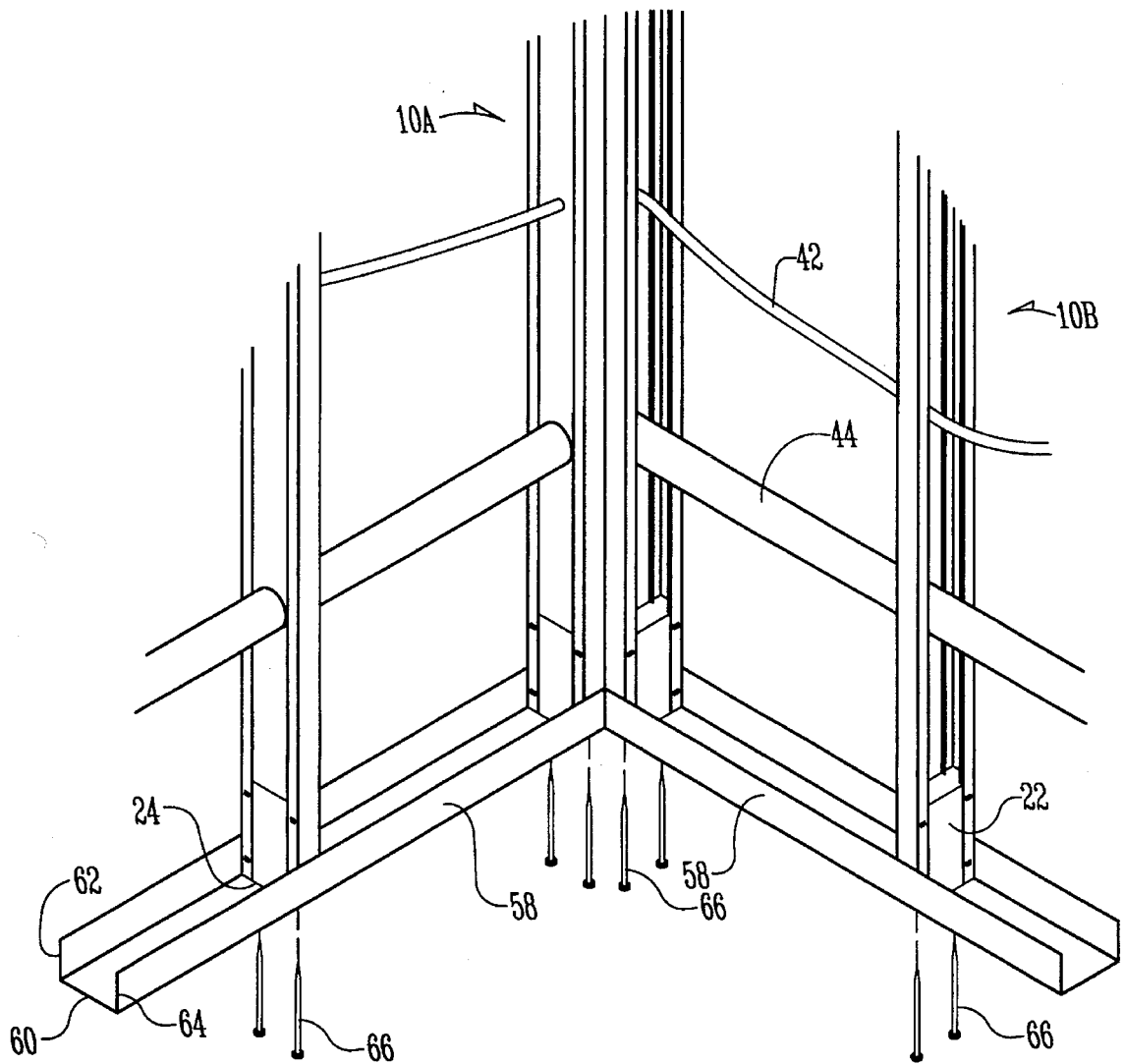
FIG. 8 is a partial perspective view showing wall studs used to frame an outside wall and an inside wall mounted to a lower track.

As shown in FIG. 1, the top and bottom core elements 22 and 30 of the wall studs 10A and 10B can be nailed or screwed to wooden plates 56. This represents a significant advantage over prior art metal studs that cannot easily be attached to wood. Although the embodiment as shown in FIG. 1 works well in a variety of applications, there are many instances in which wood is not the desired material. An alternative means of mounting the studs 10A and 10B is shown in FIG. 8. The wall studs 10A and 10B are positioned in a lower U-shaped track 58. The lower track 58 is made of galvanized steel or similar material.

The lower track 58 has a back wall 60 and side walls 62 and 64 projecting upward. The bottom end 24 of the wall studs 10A and 10B abuts the back wall 60. The side walls 50 and 52 of the frame members 16 fit against the side walls 62 and 64 of the lower track 58. Nails or screws 66 are inserted through the back wall 60 and into the bottom core element 22 to secure the wall stud 10A or 10B in the lower track 58. Similarly, a screw or nail 66 can be inserted from the bottom core element 22 and into the back wall 60. The lower track 58 can be secured to the foundation using a variety of attachment mechanisms.

Note that wooden studs, in addition to wall studs 10A and B, can also be easily mounted in the lower track 58. Consequently, the same lower track 58 can be used with a wall consisting of both wooden studs and wall studs 10A and 10B.

Replacing the customarily used wooden plate 56 with a metal lower track 58 has many advantages. The metal lower track 58 is fire resistant, resilient, and light weight. In areas where termites are especially troublesome, replacing wood with metal also prolongs the life of the wall.

Similarly, an upper track can also be used to align and position the wall studs 10A and 10B at their top ends 32.

As previously stated, it is particularly important that wall studs 10A used in outside wall applications be able to support large loads. As the studs increase in size, additional support is often desired to withstand twisting and bending forces. This is particularly important when the design of the present invention is rotated and used as a joist. FIG. 9 illustrates an alternative embodiment of the invention. Except as described below, the structural member 68 is identical to the wall stud 10A. Because the structural member 68 may be rotated to a horizontal position in operation, top and bottom core elements 30 and 22 are now referred to as the first and second core elements 70 and 72 (not shown), respectfully. Similarly, the top and bottom ends 32 and 24 of the frame members 16 are referred to as the first and second ends 74 and 76 (not shown).

The insulative material 46 is reinforced with a truss 78 that extends along the longitudinal axis of the frame members 16 within the cavity 20 between the frame members. The truss 78 is immersed within the insulative material 46 (see FIG. 10). Molding the insulative material 46 around the truss 78 reinforces the insulative material, which in turn reinforces the structural member 68. This enables the structural member 68 to withstand large twisting and bending forces. The preferred material for the truss 78 is metal.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A wall stud for use in framing structures such as houses and buildings, said wall stud comprising:

two elongated generally C-shaped frame members each having an outer surface, an inner surface, a top end, a bottom end, a back wall, two opposing side walls extending from said back wall, and two keepers, each of said keepers being attached to one of said side walls and extending generally toward the other of said keepers, said inner surfaces being spaced apart from one another to form a cavity there between;

a top core element positioned within said cavity near said top ends and at least partially enclosed by said inner surfaces of said frame members; and a bottom core element positioned within said cavity near said bottom ends and at least partially enclosed by said inner surfaces of said frame members;

said keepers securing said top and bottom core elements to said frame members;

said top and bottom core elements being spaced apart and forming a space between said core elements and said frame members.

2. The wall stud of claim 1 wherein said top and bottom core elements have slits for accepting said keepers of said frame members.

3. A wall frame comprising:

a plurality of wall studs spaced apart and parallel to each other, each of said wall studs comprising two elongated generally C-shaped frame members each having an outer surface, an inner surface, a top end and a bottom end, said inner surfaces being spaced apart from one another to form a cavity there between, a top core element positioned within said cavity near said top ends and at least partially enclosed by said inner surfaces of said frame members, a bottom core element positioned within said cavity near said bottom ends and at least partially enclosed by said inner surfaces of said frame members, said top and bottom core elements being rigid and suitable for accepting nails and screws; and a generally U-shaped lower track having a back wall and two facing side walls extending upwardly;

each of said bottom core elements of said wall studs abutting said back wall and extending between said side walls of said lower track and being rigidly attached to said lower track at said back wall.

4. The wall frame of claim 3 further comprising a generally U-shaped upper track for receiving said top ends of said wall studs.

5. The wall frame of claim 3 wherein said lower track is made of metal.

6. The wall frame of claim 4 wherein said upper track is made of metal.

7. The wall frame of claim 4 wherein said upper track having a back wall and two facing side walls extending downwardly, each of said wall studs positioned orthogonal to said upper track with said top ends of said wall studs abutting said back wall and extending between said side walls of said upper track.

8. The wall frame of claim 7 wherein said upper track is made of metal.

9. A structural member for use in framing structures such as houses and buildings, said structural member comprising:

two elongated generally C-shaped frame members each having a first end, a second end, two opposing side walls and an interconnecting web between said side walls, said side walls and said interconnecting web forming a cavity there between with said side wall providing a mounting surface for a wall facing;

a first core element positioned within each of said cavities said cavity near said first ends and at least partially enclosed by said side walls and said interconnecting web of said frame members;

a second core element positioned within each of said cavities said cavity near said second ends and at least partially enclosed by said side walls and said interconnecting web of said frame members;

an insulative material positioned within each of said cavities between said first and second core elements; and a metal truss extending along said longitudinal axis between said frame members within each of said cavities, said truss being immersed within said insulative material.

\* \* \* \* \*